(12) United States Patent
Perera

(10) Patent No.: US 9,931,794 B2
(45) Date of Patent: Apr. 3, 2018

(54) FABRICATION OF COMPOSITE STRUCTURES

(71) Applicant: Pascale Industries, Inc., Pine Bluff, AR (US)

(72) Inventor: Willorage Rathna Perera, Raynham, MA (US)

(73) Assignee: Pascale Industries, Inc., Pine Bluff, AR (US)

( * ) Notice: Subject to any disclaimer, the term of this patent is extended or adjusted under 35 U.S.C. 154(b) by 432 days.

(21) Appl. No.: 14/756,567

(22) Filed: Sep. 18, 2015

(65) Prior Publication Data

US 2017/0080644 A1  Mar. 23, 2017

(51) Int. Cl.
*B29C 70/22* (2006.01)
*B29C 70/54* (2006.01)
*D06B 3/06* (2006.01)

(52) U.S. Cl.
CPC .......... *B29C 70/222* (2013.01); *B29C 70/543* (2013.01); *D06B 3/06* (2013.01); *B29K 2713/00* (2013.01)

(58) Field of Classification Search
CPC .................................................. B29C 70/222
See application file for complete search history.

(56) References Cited

U.S. PATENT DOCUMENTS

| | | |
|---|---|---|
| 1,992,259 A | 2/1935 | Taylor |
| 2,000,935 A | 5/1935 | Dreyfus |
| 3,383,846 A | 5/1968 | Takada |
| 4,906,506 A | 2/1990 | Nishimura |
| 5,212,010 A | 5/1993 | Curzio |
| 5,230,956 A | 7/1993 | Cole |
| 5,698,318 A | 12/1997 | Burton |
| 7,252,726 B2 | 8/2007 | Lenferink |
| 2007/0141335 A1* | 6/2007 | Perera ............... D02G 3/404 428/375 |
| 2014/0158276 A1* | 6/2014 | Higgins ............ A47G 27/0212 156/60 |
| 2014/0308136 A1 | 10/2014 | Jevons |
| 2014/0309337 A1 | 10/2014 | Nagano |

FOREIGN PATENT DOCUMENTS

| | | |
|---|---|---|
| GB | 557420 | 5/1942 |
| JP | 57-35022 | 2/1982 |
| JP | 05106156 | 4/1993 |

* cited by examiner

*Primary Examiner* — Xiao S Zhao
(74) *Attorney, Agent, or Firm* — Michael de Angeli

(57) ABSTRACT

Yarns for use in manufacture of composite structures are intermittently coated with adhesive, and may be twisted as well. These yarns are then woven into fabric, and heat and pressure applied to the intermittently-coated yarns to provide dimensional stability and to prevent unravelling of the fabric during cutting and handling. The fabric is then disposed in a mold or over a mandrel, and a curable resin applied and caused to cure. Provision of the adhesive in intermittent fashion limits propagation of cracks that may form at the location of the adhesive, which does not bond well to the curable resin.

16 Claims, 3 Drawing Sheets

FIG. 1

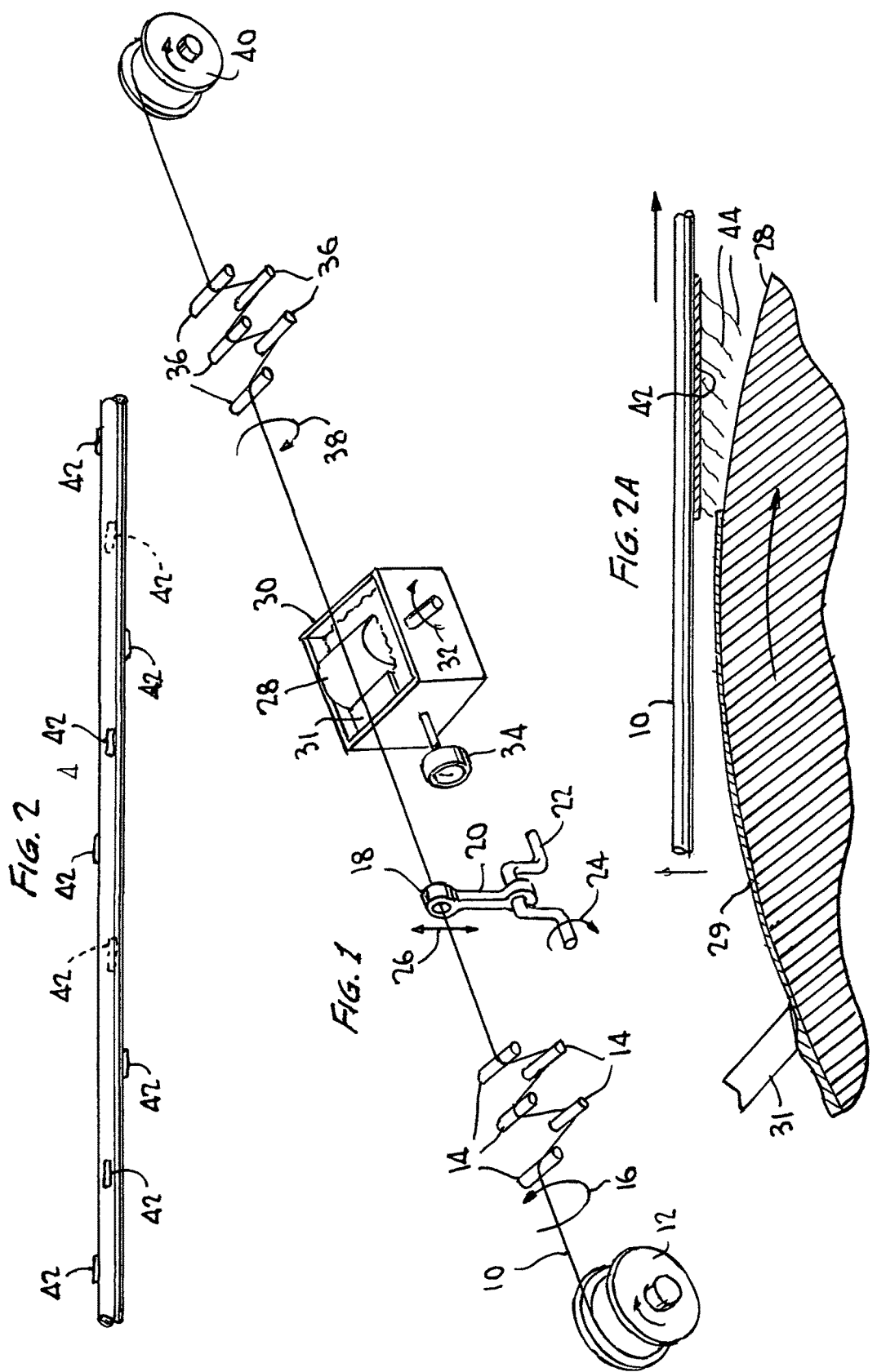

FABRICATION OF COMPOSITE STRUCTURES

FIELD OF THE INVENTION

This application relates to improvements in fabrication of composite structures, in particular, structures made up of high-strength fibers embedded in a matrix of a relatively flexible curable resin material. High strength, lightweight parts having complex shapes can be made by disposing the fibers, typically provided in the form of fabrics or tapes, in a mold, providing a quantity of curable resin in contact with the fibers, and curing the resin. The matrix formed by the cured resin secures the high-strength fibers in their desired orientation, thus producing complex parts without the necessity of machining, and without waste of material, enabling complex, strong, lightweight composite components to be produced at low cost.

BACKGROUND OF THE INVENTION

It is well known that lightweight yet strong and durable structures ranging from simple to complex shapes can be formed of composite materials comprising fibers in a matrix of cured resin. (Concrete and wood, for example, are also considered composite materials, but are outside the scope of this invention.) Perhaps the most common composite material of this type is that referred to as "fiberglass," or "glass-reinforced plastic," which typically comprises glass fibers in a matrix of a curable resin, e.g., polyester, vinylester or epoxy resin.

Typically, the resins forming the matrix are in fact mixtures of resin per se with a "hardener" or "cross-linker", that is, a chemical which when mixed with the resin (and possibly heated, as discussed below) causes a chemical reaction to take place whereby the molecules of the resin per se are cross-linked to one another and to the fibers in a "curing" step, such that a solid is formed.

In one common process for fabricating fiberglass structures, any or several of a wide variety of fabrics, both woven and non-woven, made up of fibers of glass, are disposed in a mold and impregnated with a hardening resin, typically polyester, vinylester or epoxy resin, and the resin allowed or caused to cure. Other materials are of course known for both the fabric and the resin; common choices for the fabric are aramids, such as that sold as Kevlar, and carbon fiber materials. It is also known to provide the fibrous materials in unidirectional form, that is, not as fabric per se, but commonly as tapes comprising a large number of individual filaments, or as yarns.

Various techniques are also known for application of the resin to the fibrous material. In one common process, dry layers of fabric or unidirectional fibers can be coated with liquid resin after disposition in the mold. The resin can be applied by brush or roller to the fabric, or the assembly of fibrous material and mold can be sealed and liquid resin drawn through the fibrous material by application of vacuum. Alternatively, the fibrous material can be pre-impregnated with a resin (again, a mixture of the resin per se and a suitable hardener) that is activated by an increase in temperature. These materials, which are commonly referred to as "prepregs", or as comprising "B staged" resin, may be activated at room temperature, which requires that they be refrigerated prior to use, or may be inactive at room temperature and activated by heating after disposition in the proper configuration.

In each of these techniques the resin is cured after application to form a solid. As above, in some cases the curing takes place by application of heat, commonly by disposing the fibrous materials with resin preapplied in an oven or "autoclave"; in other cases the resin comprises a mixture of a resin component and a hardener (also known as a cross linker), mixed just prior to application, so that curing takes place by a cross linking chemical reaction between the two.

The strength, the stiffness, and durability of the structures thus formed is due primarily to the strength, that is, the modulus of elongation of the fibrous material, and requires that the matrix of cured resin maintain the fibers in their proper alignment after curing; the resin itself is typically somewhat flexible and of lesser strength.

More specifically, the load carrying capacity (the strength) of composites is a function of the tensile strength and the alignment of the fibers used. The stiffness is a function of the Young's modulus (sometimes called tensile modulus or elastic modulus) of the fibers. In general, the durability of a composite in a normal environment depends on how well the reinforcing fibers and the matrix are bonded. If the composite is to be used in a corrosive or abrasive environment, the material of the matrix plays a major role in durability. While the load carrying capacity and the stiffness of the structures thus formed is due primarily to the strength and modulus of elongation of the fibrous material, the durability of the composite component primarily depends on the compatibility between the fibrous material and the resin used. Thus it is essential that the matrix of cured resin maintain the fibers in their proper alignment after curing, which in turn requires good interfacial bonding between the resin and fiber matrix.

During the curing process the resin material undergoes a chemical reaction, whereby chains of resin molecules are bonded to one another to form a solid, and are also chemically bonded to the fibrous materials, so that the fibrous materials are locked in place by a matrix of the cured resin. The fibrous and resin materials must be chosen for compatibility, so as to obtain the maximum interfacial bonding between the matrix material and the fibrous material. As above, in such structures, the load-carrying capability of the end product is optimized by the strong fibers being properly aligned to take the stress, while the lower-strength matrix material secures the fibers in the proper position and assists in distributing the load between the fibers.

Commonly, the fibers are provided as cloth, typically in a "plain weave" construction, where yarns made up of numerous fibers are interwoven in "warp" and "weft" directions. As is well known, the plain weave method of weaving can be performed at high speed, reducing costs, and a selvage may be provided on the edges of the fabric, keeping the fabric stable. However, when the fabric is later cut to shape, the fabric can become unraveled easily as the yarns are not locked in position, as they are in a knitting process, for example. In order to simplify handling of the fibrous materials, and to ensure that, for example, the yarns making up a fabric maintain their proper relative disposition and alignment while being cut, and have maximum dimensional stability so that the yarn will not unravel from the fabric structure while being draped into position and the like, it is known to provide an adhesive on the fabric as a yarn locking mechanism. The adhesive provides dimensional stability to the fabric and prevents the fabric from becoming unraveled or buckling, and prevents the yarns from becoming misaligned or sagging during subsequent cutting and handling steps.

More specifically, some of the yarns to be woven into the fabric can be coated with a "hot melt" adhesive and heated while being woven, so as to form a grid providing dimensional stability to the fabric. The woven fabric containing parallel hot melt-coated yarns separated by, for example, 0.05-1", allows the user to slit the fabric without concerns of fabric unravelling or loss of dimensional stability. This is a common practice in carbon yarn weaving where both edges of the fabric is locked in by two parallel hot melt-coated yarns on each side, separated by about 1". Once the edges are slit, the remaining adhesive coated yarn on each side stabilizes the fabric.

In some circumstances, where different layers of fabric contact one another in order to build up the thickness of the structure to a desired degree, the adhesive may be employed by application of heat and pressure during the assembly process to secure the adjoining layers to one another, allowing the structure to be built-up as desired without having the various layers of fabric slip out of position. The built-up structure is then infused with a hardening resin (as above, typically a mixture of the resin per se and a hardener) and the resin allowed to cure, so as to form the final composite structure. See generally U.S. Pat. No. 5,212,010 to Curzio et al and U.S. Pat. No. 4,906,506 to Nishimura et al.

An adhesive commonly used for this purpose is ethylene-vinyl acetate (EVA), which is an inexpensive "hot melt" adhesive. Other hot melt adhesives, such as polyolefins, polyamides, and polyesters are suitable and are to be understood to be within the scope of this disclosure although only EVA is mentioned specifically, for brevity.

As noted, EVA is commonly applied to some fraction of the yarns woven into the fabric, typically by passing yarn through a bath of EVA and removing the excess EVA by passing the yarn through a sizing die. This results in a yarn completely encapsulated by EVA. The EVA-coated yarn can then be woven into the fabric together with uncoated yarns. The adhesive-coated yarns can be provided in both "machine" (i.e., warp) and "cross machine" (i.e., weft) directions. During weaving, the hot melt-coated yarns are passed through a heated nip roller, so that the adhesive yarns in machine and cross machine directions adhere to each other and to the other yarns of the fabric, forming a grid stabilizing the fabric during subsequent cutting and handling steps.

Furthermore, if the fabric is then disposed in a mold or the like, heat and pressure can be applied to the EVA-coated yarns, e.g., by a heated roller tool, so that the EVA-coated strands in one layer of fabric adhere to the yarns of the adjoining layer(s), securing the fabric layers in their desired position before the resin is applied.

Similar techniques may be used to stabilize and assemble tapes of unidirectional fibers.

However, a problem arising from the practice of using EVA-encapsulated yarns as part of a fabric or tape to be employed in forming a composite structure is that the resins commonly used do not form a chemical bond to the EVA. Accordingly, the strength of the composite structure is compromised by this practice. More specifically, when stress is later applied to the composite structure, the weakened points in the structure at which the EVA is present form "stress raisers"—that is, points at which a crack can be initiated.

Still more specifically, as is well known, any sudden discontinuity in the properties of a stressed member will cause stresses to be concentrated at that point. The EVA-coated yarns used in the prior art practice form such discontinuities in the part, and cracks frequently start at their locations. Moreover, a crack thus started can propagate along the length of the weakened line in the structure formed by the presence of an EVA-coated yarn, possibly leading to catastrophic failure.

It would be possible to employ an adhesive other than EVA, to which the resin would bond, or to provide additives to the EVA that would allow such bonding, but both of these alternatives add significantly to the cost.

It is therefore an object of the invention to provide a method for fabrication of composite structures that avoids this problem while preserving the several advantages of employment of the EVA adhesive mentioned above, that is, primarily to prevent unraveling of a woven fabric during cutting and handling, and secondarily to hold the components of a fabric or tape to one another and to other sections of fabric or tape while being placed into the desired configuration.

SUMMARY OF THE INVENTION

According to the present invention, the yarns continuously encapsulated with EVA or the equivalent in the prior art are replaced by intermittently-coated yarns, with the coating on one side only of the yarn. This reduces the amount of EVA in the eventual structure, while providing enough to perform the function of stabilizing the fabric against unraveling and the like. Simply reducing the amount of EVA reduces the amount of stress raisers inherent in the completed composite structure, while providing the EVA in intermittent fashion reduces the likelihood of a crack propagating along a weakened path in the structure formed by the presence of an EVA-encapsulated yarn.

A yarn with the EVA coating on one side only can be formed by passing the yarn over a roller partially submerged in a bath of molten EVA, rather than passing the yarn itself through a bath of molten EVA, followed by passing it though a die to remove the excess EVA. Making the coating intermittent can be accomplished by periodically lifting the yarn from the surface of the roller. Furthermore, the EVA coating can be made to spiral around the yarn by twisting the yarn while or prior to passing it over the roller. This twisting process can be combined with intermittent application of EVA to provide a yarn having "dabs" of EVA spaced along its length and spaced radially around the yarn.

A composite structure can then be formed by the following steps:

Prepare fabric or tapes of the desired fibrous material employing the intermittently-coated yarns. In the case of fabrics, the intermittently-coated yarns can be woven into the fabric with yarns of the fibrous material. In the case of tapes of unidirectional material the intermittently-coated yarns can be laid into the tapes interspersed with the desired fibrous material.

Assemble the fabrics or tapes into a mold, wrap them around a mandrel, or otherwise cause them to assume the desired configuration, and, if desired, apply heat and pressure to the intermittently-coated yarns to hold the fabric components or tapes in the desired position.

Apply a curable resin if the fibrous material was not previously impregnated with resin. Typically this will be accomplished by brush or roller, or by drawing the resin into the assembly of fabrics in the mold by vacuum.

Cause the resin to cure. This can be done by employment of a resin which reacts chemically with a hardener, or by heating a resin which undergoes a chemical reaction when heated.

The result is a cured component wherein the amount of EVA is strictly limited to small localized points, whereby when a stress is later applied to the component any cracks which may form at these points are prevented from propagation.

In a further refinement, the application of EVA to the yarns can be controlled such that when the yarn is periodically lifted from the surface of the roller, very fine filaments or "angel hairs" of EVA are formed hanging from the yarn. The diameter and the length of these filaments depend on the viscosity of the EVA, which is controlled by control of its temperature, the height and rate at which the yarn is lifted from the roller, and the running speed, as the angel hairs are stretched by the moving yarn. The angel hairs' diameter may range from few hundred nanometers to several micrometers, and their length may range from a few microns to a few inches. These angel hairs tend to wrap around the yarn or be dragged along the moving yarn surface, depositing ultra-fine adhesive filaments parallel to the yarn axis. The angel hairs of EVA can be wrapped around the yarns by twisting the yarn while processing, or the angel hairs can be caused to lie axially parallel along the yarns, by blowing air along the yarn, inducing static electricity onto the substrate yarn, exposing the yarn to corona flame, or applying a light vacuum to drag the angel hairs along the yarn axis. The resin viscosity and the yarn lifting height can also be adjusted so that short angel hairs are created, resulting in tiny "tentacles" around the yarn. These angel hairs add to the ability of the EVA to hold the fabric together during handling and assembly without materially impairing the strength of the final composite product.

BRIEF DESCRIPTION OF THE DRAWINGS

The invention will be better understood if reference is made to the accompanying drawings, in which:

FIG. 1 shows schematically apparatus for preparing a yarn intermittently coated on one side only with EVA;

FIG. 2 shows an exemplary yarn prepared using the apparatus of FIG. 1;

FIG. 2(a) shows a further enhancement;

DETAILED DESCRIPTION OF THE PREFERRED EMBODIMENTS

Figure 3:
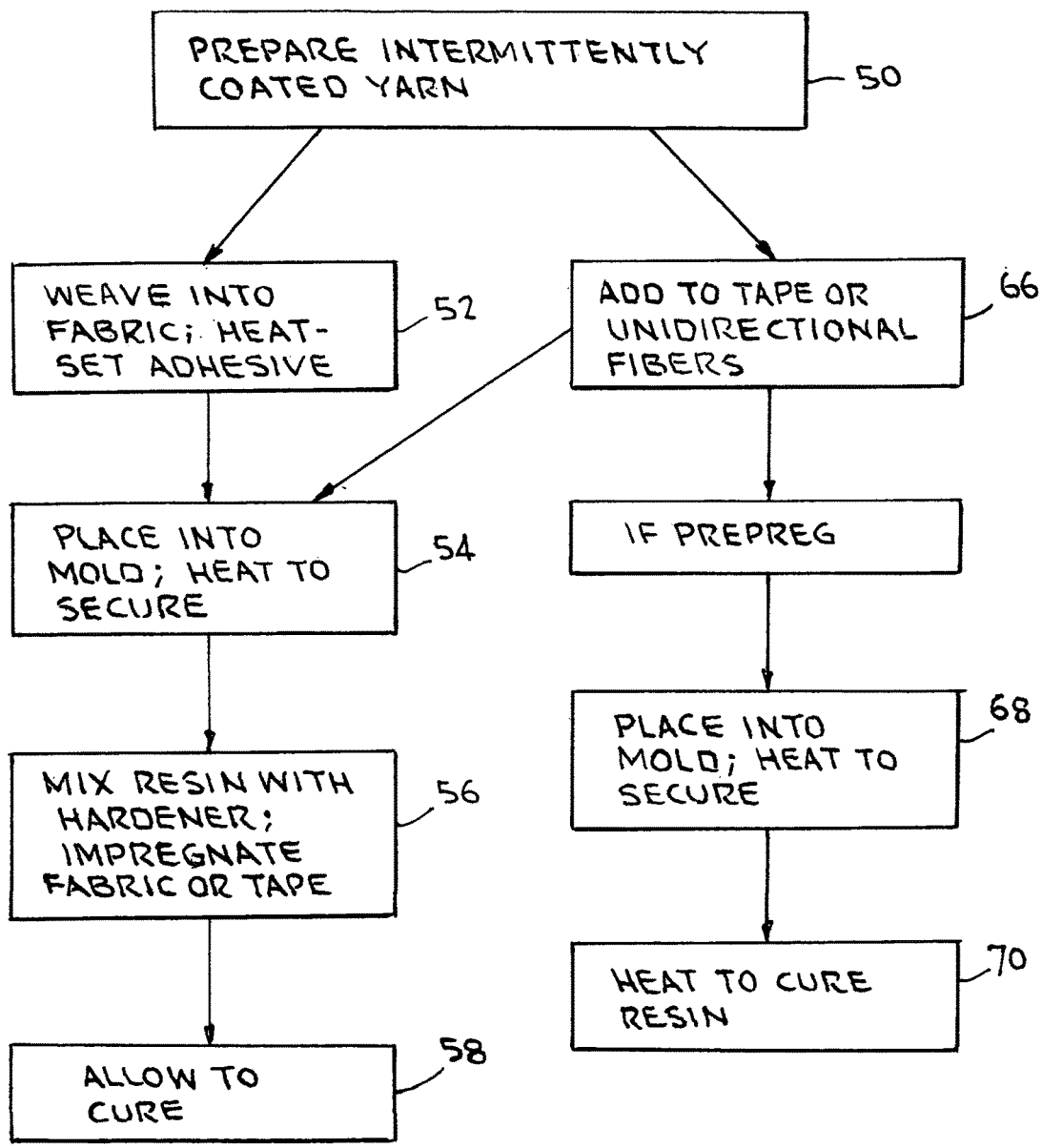
FIG. 3 shows a flowchart of the steps according to the invention, with several possible alternatives.

As mentioned, FIG. 1 shows schematically an apparatus for preparing a continuous, intermittently-coated yarn. A yarn 10 is pulled from a supply spool 12 and along a processing path through the apparatus, terminating at a driven take-up reel 40. If it is desired to twist the yarn, it is first passed through a series of parallel rollers 14 spaced from one another so that as rollers 14 are rotated around the axis of the yarn 10, as indicated by arrow 16, the yarn is twisted. The yarn then passes through a guide 18. Guide 18 is mounted on a connecting rod 20 driven by a crankshaft 22, rotated as indicated by arrow 24, so that the guide 18 and thereby the yarn reciprocates vertically as indicated by arrow 26. Other methods of reciprocating the yarn are possible; for example, a solenoid could be operated to move the guide, or a roller with recessed sections could be employed, as in U.S. Pat. No. 1,992,259 to Taylor. Yarn 10 then passes over the surface of a roller 28, rotated as indicated by arrow 32, supported in a tank 30 of molten EVA, indicated at 31; the EVA is maintained at a desired temperature by a temperature-controlling device 34. An overhead infrared heater may also be employed. A doctor blade 31 (see FIG. 2A) may be employed to control the thickness of the layer of EVA on the surface of roller 28. After cooling to solidify the EVA, the yarn is then untwisted by passing through a second set of rollers 36, rotated in the opposite direction as rollers 14, as indicated by arrow 38, and spooled up as indicated at 40.

The reciprocation of guide 18 causes the yarn 10 to be repeatedly brought into contact with the surface of roller 28, and withdrawn therefrom, so that EVA is applied intermittently to the yarn 10, while the twisting of yarn 10 by rollers 14 and subsequent untwisting by rollers 36 causes the EVA to be applied at different orientations, spaced around the surface of the yarn.

Those of skill in the art will recognize that it may be necessary to provide "pinch points" before and after the assemblies of rollers 14 and 36, to ensure the twisting is effective. These may comprise "nip rollers" (not shown) to preserve the radial orientation of the yarn.

Those of skill in the art will also recognize that the degree of twisting can be controlled by controlling the rate and direction of rotation of rollers 14 and 36 with respect to the speed at which the yarn passes through the apparatus of FIG. 1. For example, if rollers 14 and 36 are rotated in the opposite directions and at the same rate, the twist imparted to the yarn will be a "false twist" in that the twist initially imparted by rollers 14 will be reversed by rollers 36, although some twist may remain due to the presence of the EVA.

It would also be possible to rotate rollers 14 and 36 in the same direction, in which case a "true twist" would be obtained. It would also be possible to rotate rollers 14 and 36 in the same direction at differential speeds, in which case a desired degree of twist can be obtained. In general a light false twist is preferred, as a heavy twist results in a yarn that tends to become tangled, especially if not properly tensioned. Some twist is beneficial in the final product since light twisting tends to enhance the tensile strength.

Thus, various options are made possible, by controlling the rate and direction of rotation of rollers 14 and 36, the speed at which the yarn is passed through the apparatus, the viscosity of the EVA, whether the EVA is intermittently applied to the yarn, whether the "dwell time" during which the yarn is in contact with the EVA-carrying roller 28 is equal to the time during which is it is withdrawn from the roller, and so forth. Optimization of the process parameters to achieve a desired result is within the skill of the art.

One preferred result is shown schematically in FIG. 2: a length of yarn 10 is provided with "dabs" 42 of EVA spaced along its length and around its circumference. These dabs can range from on the order of 0.25-2 inches long. A preferred "pitch", i.e. the relative distance between the dabs 42, controlled by operation of the reciprocating guide, might be between 0.25-4 inches, and the rate at which the orientation of the dabs is rotated around the yarn due to the twisting might likewise be between 0.1-3 rotations/inch.

FIG. 2(a) shows a further improvement. In FIG. 2(a), one sees the yarn being withdrawn from the surface of roller 28, having a thin coating 29 of EVA on its surface, the thickness of the EVA layer on the surface of the roller being controlled by a doctor blade 31. A dab 42 of EVA is seen having been deposited on the surface of yarn 10. The viscosity of the EVA can be chosen by temperature control, together with other relevant factors, such as the speed at which the yarn passes over the surface of roller 28 and the rate at which it is withdrawn from the surface of the roller by reciprocating guide 18, such that fine filaments or "angel hairs" 44 of EVA are formed as the dab is removed from the surface of the roller 28. These fine filaments of EVA help to bond the yarns having an intermittent coating of EVA to the untreated yarns in a weaving operation, and help the EVA to penetrate the yarns of opposed layers of fabric, for example, in subsequent assembly of the components of the composite.

These angel hairs (having diameters in the nano- to micro-meter scale and lengths between 0.01" and 3") tend to be dragged along with the substrate yarn, forming well-spaced fine filaments parallel to the axis or to be lightly wrapped around the yarns. Vacuum or forced air may be employed to guide the angel hairs in a desired direction with respect to the yarn. These angel hairs do not have sufficient stiffness to penetrate another layer of fabric. However, they may provide effective bonding when yarns having dabs of EVA with angel hairs are pressed, with application of heat, against plain yarns during the weaving process, or in subsequent assembly of layers of fabric in a mold or the like.

One advantage of optimization of the process parameters so as to form angel hairs is that they provide adhesive properties to the yarn, with minimum masking of the substrate yarn, that is, so as to provide minimum interference with formation of a bond between the resin used to form the matrix of the eventual composite structure and the fibers of the yarns.

FIG. 3 shows the steps in performance of the method of the invention, illustrating several alternatives. At step 50, the intermittently-coated yarn is prepared, as described above. Where the yarn is to be used in a woven fabric, of, e.g. fiberglass or aramids, it is woven into the fabric at step 52, while heat is applied to cause the EVA to adhere to the yarns, stabilizing the fabric for further handling. The material of the yarn that is intermittently coated can be the same as the material of the fabric, or another material. Layers of fabric are then disposed in a mold, draped over a mandrel, or otherwise caused to take a desired shape, at step 54. The intermittently-coated yarns can be heated with a heated roller or the like, to cause the fabric layers to adhere to one another in the desired configuration.

More specifically, as layers of fabric are assembled to one another in step 54, the EVA "dabs" can be employed to adhere them to one another; upon application of heat and pressure, the EVA will diffuse from one layer of fabric into the adjoining layers, securing them together in the desired position.

In step 56, the resin is mixed. The resin may be one of the usual two-part resins, e.g., a liquid epoxy resin mixed with a liquid hardener so as to cause a chemical reaction to take place, whereby upon curing the resin is cross-linked to itself and chemically bonded to the material of the fabric. The mixed resin is then impregnated into the fabric layer, by brushing, use of a roller, application of vacuum to draw the mixed resin into a sealed assembly, or otherwise.

After the layers of fabric are thus assembled the resin is allowed to cure, at step 58, forming the composite structure desired.

It will be appreciated that in this embodiment, the layers of fabric are placed into the mold, over the mandrel or the like, "dry"; that is, the resin is applied later. By use of a heated roller to apply heat and pressure to the layers of fabric as they are built up to a desired thickness, the dabs of EVA can be used in such a dry process to secure the layers of fabric to one another as well as to any other components of the composite. For example, such composite components are commonly "cored" with a lightweight material (for example, balsa or foam) spacing layers of fabric on either side. This increases rigidity for a given weight of material. This coring step can also be practiced in the other embodiments of the invention.

It will also be appreciated by those of skill in the art that composite structures are also commonly made in a "wet lay-up" process, in which, for example, the layers of fabric are impregnated with the curable resin prior to assembly in a mold, and likewise that individual layers of fabric are commonly impregnated with liquid resin prior to being placed in a desired orientation on a preexisting structure, for example to strengthen a previously-made joint. In such wet processes, the EVA dabs will not be useful to hold the fabric layers in place, but the presence of intermittently-coated yarns in the fabric will still be useful in preventing unraveling of the fabric, e.g., during cutting of the fabric to desired shapes.

Fibrous stiffening materials for composite construction are also conventionally provided in the form of unidirectional "tapes", wherein all of the fibers run in the same direction. Carbon fiber is commonly provided in this form. As indicated at step 66, these tapes can be provided with "dabs" of EVA to hold them in position during assembly. The "dabs" of EVA could be applied directly, by running the tape through the apparatus of FIG. 1, although the twisting step might need to be omitted, or yarns with an intermittent coating of "dabs" of EVA could be incorporated into the tapes. The tapes could then be placed into a mold or over a mandrel at step 54, the tapes being heated and urged against adjoining tapes or core materials to cause the EVA to hold the tapes in position. As above, the assembly is then infused with resin at step 56, and allowed to cure at step 58.

Such fibrous materials are also provided in "prepreg" form, wherein the bonding resin is applied to the materials and partially cured ("B staged") before assembly. These resins are typically heat-activated; prepreg materials that become chemically active at room temperature are kept refrigerated until use, and others that are inactive at room temperature are heated after assembly, by being placed in an oven or "autoclave", or by passing an electric current through the materials if electrically conductive, as is carbon.

Accordingly, where the method of the invention is to be employed with prepreg materials, the EVA "dabs" are again applied at step 66, the materials assembled into a mold or draped over a mandrel and heat and pressure applied at step 68 to cause the materials to be bonded by the EVA, and a final heating step performed at step 70 to cure the resin.

More specifically, the invention can be employed in connection with prepreg materials in two different ways, both useful:

1) A prepreg fabric can be made containing intermittently coated yarn—that is, yarns intermittently coated with EVA can be introduced into a fabric otherwise woven of prepregged yarn; or
2) A prepregged yarn can be processed as described above to provide an intermittent coating of EVA, and woven into fabric or processed to form a tape.

In either case, the EVA can be employed to prevent unraveling of the fabric or tape. The intermittent dabs of EVA can also be used to adhere adjoining layers of fabric to one another.

Accordingly, where the method of the invention is to be employed with prepreg materials, the EVA "dabs" are again applied at step 66, the materials assembled into a mold or draped over a mandrel and heat and pressure applied at step 68 to cause the layers of materials to be bonded to themselves, and a final heating step performed at step 70 to cure the resin.

Figure 4:
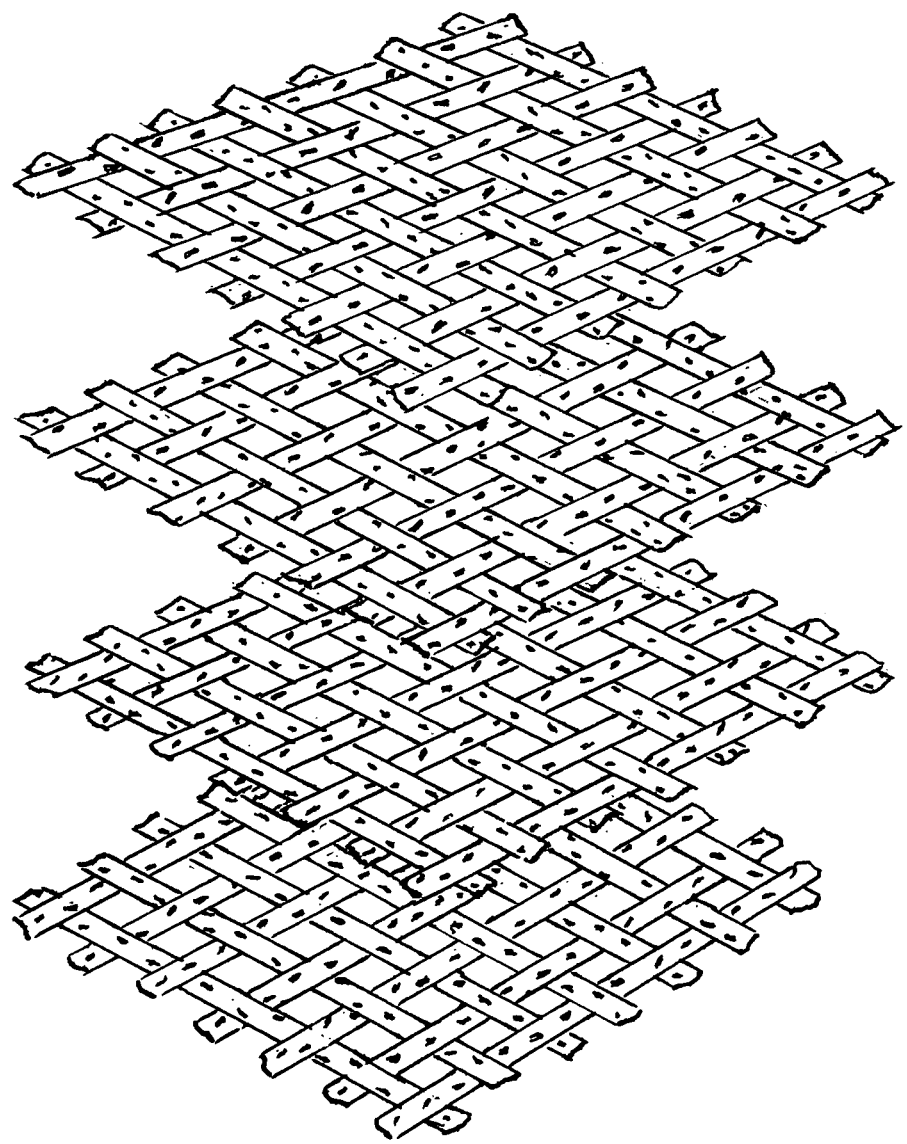
FIG. 4 shows an exploded view of a composite made according to the method of the invention.

FIG. 4 shows schematically an exploded assembly of four sheets of fabric having had dabs of EVA applied essentially at random over their surfaces according to the invention. These dabs of EVA can prevent unraveling of a woven fabric, and can also be used to secure the layers of fabric to one another. It will be apparent that if heat and pressure are applied to this stack of fabric, the EVA will be softened and diffuse into the adjoining layers of fabric, securing them in their desired position. It will also be apparent that after resin has been applied and cured, and if a stress is then applied to the structure, any crack starting at one of the "dabs" of EVA will be largely precluded from propagation along the yarn, since the dabs are effectively encapsulated by the epoxy material of the matrix. By comparison, if a yarn entirely coated by EVA were employed, as in the prior art, it can easily be seen that a crack could readily propagate through the entire composite structure, with possibly disastrous results.

More specifically, the biggest disadvantage inherent in use of reinforcing yarns fully encapsulated with hot melt adhesive such as EVA within the composite structure, as practiced by the prior art, is that the EVA is incompatible with and does not bond to the reinforcing fibers or the resin of the matrix. This results in weak lines, that is, interfacially incompatible linear sections sandwiched between the resin and the substrate yarn, formed extending throughout the structure thus made. As a result, when stress is applied to the structure in service, cracks can be initiated at the stress raisers caused by discontinuity of the part's characteristics at the location of the coated yarns and then propagate along the length of the coated yarn, possibly causing the part to fail prematurely.

By comparison, according to the invention the coating can be provided on a single side of the yarn, and can be made to spiral around the yarn, and also or alternatively to be intermittent. If the EVA coating is made intermittent, the EVA dabs in the part may still act as stress raisers, possibly allowing a crack to form, but the crack is much less likely to propagate; that is, the propagation of the crack will be arrested at the end of the EVA dabs.

If the EVA is provided in the form of a spiral coating around the yarn, cracks are again much less likely to propagate, as the crack propagation direction changes along the length of the yarn, requiring more stress to cause failure. If the EVA is provided in both spiral form and made intermittent, the part will provide even better strength characteristics.

Thus, according to the invention, much less EVA is employed than in the prior art to prevent a woven fabric from unraveling during cutting and handling. Furthermore, the EVA is disposed in such a way as to substantially limit the propagation of cracks.

Use of the EVA to bond individual fabric layers to one another in laying-up a part having a number of layers of fabric (and possibly other materials, such as balsa or foam cores) may provide an added advantage. This aspect of the invention is more useful when the materials used are not pre-pregged; some prepregs are sufficiently tacky to adhere to one another and to core material without adhesive.

The invention having been described, certain alternatives can usefully be discussed, and their advantages and disadvantages summarized.

A functionally similar product, in that continuous lines of EVA in the finished product can be avoided, can be made by wrapping a yarn coated in EVA around a substrate yarn. This could then be woven into a cloth. Although this process creates a spiral, and thus intermittent, coating around the substrate yarn and can be performed at high manufacturing speed, it presents many disadvantages to the end user, for example low yield (less yardage/pound), less coating/length, and higher cost due to the added labor and process step.

The problems noted above due to the inability of the EVA to bond to both reinforcing yarn and the resin of the matrix can be reduced to a degree by improvement of the coupling of the resin to the fibers. For example, glass yarns can be pretreated with a coupling agent, for example that sold as Silquest A1100 silane, the chemical name of which is gamma amino trimethoxysilane. This coupling agent will promote the bonding between the bare yarn and the epoxy resin, thereby strengthening the crack arresters around the EVA dabs. However, this step adds cost.

It is also within the scope of the invention to add additives to the EVA (or alternative hot-melt adhesives, such as polyolefins) to promote interfacial bonding between the resin of the matrix, for example epoxy, and the EVA as well as between the fibrous material, for example glass, and the EVA. Suitable additives known as grafted or reactive polymers are based on Glycide Methacrylate (GMA), Maleic Anhydride (MAH), or various types of tie layer resins. Such reactive polymer additives can be purchased from well-known polymer producers such as Arkema, Lyondell Basell, Addivant, Bayer, or EXXON. For example, Arkema (of France) produces GMA products sold as LOTADER AX 8900, LOTADER MAH 3210, Apolyhya LC3-10, and OREVAC 18211 which can be compounded with EVA or polyolefin adhesive at a rate of 3-10%. Similarly, the Addivant Company of Connecticut produces products sold as Polybond 1103 (a grafted acrylic acid) and Polybond 3000 grade (a grafted maleic anhydride). Such additives will activate the EVA coated surface by providing active molecules to the EVA chemistry, promoting bonding of the EVA to both yarn and epoxy matrix material. This reduces the tendency of crack initiation.

Another alternative that might be considered would be the use of a coupling adhesive (meaning a resin that is compatible with both glass substrate and epoxy matrix) instead of EVA. Since such a coating may have higher degree of coupling capabilities than EVA or treated EVA (but much less degree of coupling capability than treated glass yarn and epoxy). Intermittent coating according to the invention could be much more efficient if such a material is identified.

Accordingly, while several preferred embodiments of the invention have been described, it will be appreciated that various alternatives and improvements are within the scope of the invention as defined by the following claims.

What is claimed is:

1. A method of making yarns intermittently coated on one surface with an adhesive, comprising the steps of:
providing a supply reel of uncoated yarn;
providing a driven take-up reel, whereby a processing path for said yarn is defined extending between said supply reel and said take-up reel;
providing a driven roller in a vat of molten adhesive along said processing path, the temperature of said molten adhesive being controlled to control the viscosity of said molten adhesive, whereby an upper surface of said roller extending above the surface of said molten adhesive is coated with a predetermined quantity of said molten adhesive;

reciprocating said uncoated yarn into and out of contact with the upper surface of said roller, so that the surface of said yarn is intermittently coated on one side by said adhesive;

cooling said yarn, so that said adhesive is solidified; and spooling said yarn onto said driven take-up reel.

2. The method of claim 1, wherein said yarn is twisted prior to contacting said upper surface of said roller.

3. The method of claim 2, comprising the further step of untwisting said yarn prior to spooling it onto said take-up reel.

4. The method of claim 1, comprising the further step of weaving said intermittently-coated yarn into a fabric with uncoated yarns, and applying heat and pressure to said intermittently-coated yarns during said weaving step to secure said intermittently-coated yarns to said uncoated yarns.

5. The method of claim 1, comprising the further step of controlling the viscosity of the adhesive, the rate at which said yarn is drawn over the surface of the roller, and the rate at which the yarn is withdrawn from the surface of the roller such that fine filaments of the adhesive are formed extending from the adhesive on the surface of the roller to the yarn.

6. A method of making a fabric woven of yarns intermittently coated with an adhesive and of uncoated yarns, comprising the steps of:

providing a supply reel of uncoated yarn;

providing a driven take-up reel, whereby a processing path for said yarn is defined extending between said supply reel and said take-up reel;

providing a driven roller in a vat of molten adhesive along said processing path, the temperature of said vat being controlled to control the viscosity of said molten adhesive, whereby an upper surface of said roller extending above the surface of said molten adhesive is coated with a predetermined quantity of said molten adhesive;

reciprocating said uncoated yarn into and out of contact with the upper surface of said roller, so that the surface of said yarn is intermittently coated on one side by said adhesive;

cooling said intermittently coated yarn, so that said adhesive is solidified;

spooling said intermittently coated yarn onto said driven take-up reel; and weaving said intermittently coated yarn into a fabric also comprising uncoated yarns while applying heat and pressure to said intermittently-coated yarns during said weaving step to secure said intermittently-coated yarns to said uncoated yarns.

7. The method of claim 6, wherein said yarn is twisted prior to contacting said upper surface of said roller.

8. The method of claim 7, comprising the further step of untwisting said yarn prior to spooling it onto said take-up reel.

9. The method of claim 6, comprising the further step of controlling the viscosity of the adhesive, the rate at which said yarn is drawn over the surface of the roller, and the rate at which the yarn is withdrawn from the surface of the roller such that fine filaments of the adhesive are formed extending from the adhesive on the surface of the roller to the yarn.

10. A method of forming a composite structure, comprising the steps of:

making a fabric woven of yarns intermittently coated with an adhesive and of uncoated yarns, by:

providing a supply reel of uncoated yarn;

providing a driven take-up reel, whereby a processing path for said yarn is defined extending between said supply reel and said take-up reel;

providing a driven roller in a vat of molten adhesive along said processing path, the temperature of said vat being controlled to control the viscosity of said molten adhesive, whereby an upper surface of said roller extending above the surface of said molten adhesive is coated with a predetermined quantity of said molten adhesive;

reciprocating said uncoated yarn into and out of contact with the upper surface of said roller, so that the surface of said yarn is intermittently coated on one side by said adhesive;

cooling said intermittently coated yarn, so that said adhesive is solidified;

spooling said intermittently coated yarn onto said driven take-up reel; and weaving said intermittently coated yarn into a fabric also comprising uncoated yarns while applying heat and pressure to said intermittently-coated yarns during said weaving step to secure said intermittently-coated yarns to said uncoated yarns; and disposing members of said fabric in a desired configuration;

providing a curable resin in contact with the yarns of said members of said fabric; and causing said resin to cure.

11. The method of claim 10, wherein said curable resin is a two-part mixture of a liquid resin and a hardener and is cured by a chemical reaction therebetween after application to the yarns of said members of said fabric.

12. The method of claim 10, wherein said curable resin is applied to the yarns of said fabric prior to disposition in the desired configuration, and is cured by causing the temperature of said resin to rise.

13. The method of claim 10, comprising the further step of applying heat and pressure to the yarns of the members of said fabric during the step of disposing members of said fabric in a desired configuration so as to melt the adhesive and bond the members of fabric to one another.

14. The method of claim 10, wherein said yarn is twisted prior to contacting said upper surface of said roller.

15. The method of claim 14, comprising the further step of untwisting said yarn prior to spooling it onto said take-up reel.

16. The method of claim 10, comprising the further step of controlling the viscosity of the adhesive, the rate at which said yarn is drawn over the surface of the roller, and the rate at which the yarn is withdrawn from the surface of the roller such that fine filaments of the adhesive are formed extending from the adhesive on the surface of the roller to the yarn.

* * * * *